United States Patent [19]

Kinghorn

[11] 4,323,892
[45] Apr. 6, 1982

[54] ALPHA-NUMERIC CHARACTER GENERATOR ARRANGEMENT

[75] Inventor: John R. Kinghorn, Sutton, England

[73] Assignee: U.S. Philips Corporation, New York, N.Y.

[21] Appl. No.: 120,218

[22] Filed: Feb. 11, 1980

[30] Foreign Application Priority Data

Feb. 12, 1979 [GB] United Kingdom ............... 04846/79

[51] Int. Cl.³ ............................................. G09G 00/00
[52] U.S. Cl. .................................. 340/724; 340/750; 178/30
[58] Field of Search ..................... 178/15, 30; 340/723, 340/724, 744, 748, 750

[56] References Cited

U.S. PATENT DOCUMENTS

| | | | |
|---|---|---|---|
| 3,568,178 | 3/1971 | Day | 340/724 |
| 3,868,672 | 2/1975 | Johnson | 340/724 |
| 3,877,007 | 4/1975 | Fishman | 340/724 |

*Primary Examiner*—Marshall M. Curtis
*Attorney, Agent, or Firm*—Thomas A. Briody; William J. Streeter; Edward W. Goodman

[57] ABSTRACT

An alpha-numeric character generator arrangement having as a character store a "read-only" memory in which characters are stored in a character format composed of a co-ordinate matrix (e.g. a 7×5 dot matrix) of discrete character elements. One aspect of the invention resides in storing the descender letters g, j, p, q and y such that those elements forming the "tail" of the descender letter are stored in character element rows which in a given row addressing sequence for the store precede the character element rows in which the remaining elements for the descender letter are stored. Another aspect of the invention resides in addressing the character element rows of the character store in a partially cyclic manner such that descender letters are read-out for display in a "lowered", correctly aligned, position in a row of displayed characters. FIGS. 6 and 8 illustrate the invention.

2 Claims, 9 Drawing Figures

ALPHA-NUMERIC CHARACTER GENERATOR ARRANGEMENT

BACKGROUND OF THE INVENTION

This invention relates to alpha-numeric character display by electrical means (e.g. on the screen of a television monitor or using an electrically-operated printer device), and more especially to character generator arrangements for controlling the display of characters in a character display system.

It is known to use in such a character generator arrangement a "read-only" memory device, which serves as a character store in which characters are stored in a manner representing a character format composed of a co-ordinate matrix of discrete character elements, and which is responsive to character input data, representing alpha-numeric characters, to produce character generating data which can be used for the display of the alpha-numeric characters.

Such a character generator arrangement may therefore be of a kind comprising, in addition to the character store, input addressing means for addressing the character store with character input data for a character selected for display, row selection means for producing row addresses for selecting, for a read-out operation from the character store, those character elements in a particular character element row of the character matrix, data output means for producing in said read-out operation the character generating data for the character elements in the selected character element row of the selected character, and logic control means for so controlling the input addressing means and the row selection means as to cause, for a plurality of characters to be displayed as a row of characters, the selection in turn of the character elements in a first character element row of each of said plurality of characters, then the selection in turn of the character elements in a second character element row thereof, and so on for their remaining character element rows, so that said plurality of characters are built-up element row-by-element row, as a whole, for display.

In order to limit the size of a "read-only" memory device which serves as a character store, it is known to provide for a particular character format a co-ordinate character matrix of n character element rows which is just large enough to accommodate each of the upper case letters of the alphabet. The same size of character matrix can also accommodate each of the corresponding lower case letters. However, the lower case letters g, j, p, q, and y, which are known as descender letters because they have "tails" which should descend below the bottom of a displayed character row in which they occur, can only be accommodated in their respective character matrix if they are, in effect, stored in a "raised" position in the matrix, since otherwise their "tails" would lie outside the matrix and thus would not be accommodated therein. As a consequence, a character generator arrangement of the above kind having such a character store requires additional circuitry in its logic control means for the read-out of these descender letters in order to "lower" a descender letter, as displayed, into its correct position in a character row. Without such additional circuitry a displayed descender letter would be out of alignment in the character row.

It is known for the additional circuitry to include an adder circuit to which the row addresses from the row selection means are applied and which is made operable by detector means when said character input data represents a descender letter to add to each successive row address applied to it a number appropriate for changing the row address to delay the read-out operation, in respect of the descender letter, by a number of character element rows corresponding to said number, whereby the descender letter as displayed is lowered in position by such number of character element rows so as to be in correct alignment in a displayed character row.

The lowering of the descender letters in this way requires the row selection means to provide a number of additional row addresses, and the character generator arrangement to further include enabling means responsive to said detector means for enabling said data output means to produce character generating data for a first n successive row addresses for normal read-out operation and for a second different, n successive row addresses for descender letter read-out operation. Mullard Technical Note 7 (TP1404), October 1974, describes a character generator arrangement in which the character store is a ROM (Read Only Memory) for which, essentially, the ASCII code is used for the read out of characters stored on a 7×5 dot matrix basis, and in which arrangement an adder circuit is used, as aforesaid, to effect inter alia the correct alignment of descender letters in a row of characters.

However, this additional circuitry which is required for the correct alignment of the descender letters has the disadvantage that because the adder circuit has to operate at the read out rate for the character generating data, which will usually be a fast rate, of for example 1 MHz, this adder circuit will be complex in implementation.

SUMMARY OF THE INVENTION

It is an object of the present invention to avoid this disadvantage.

According to one aspect of the invention there is provided a character store in which characters are stored in a manner representing a character format composed of a co-ordinate matrix of discrete character elements, and which is responsive to character input data representing alpha-numeric characters to produce character generating data which can be used for the display of the alpha-numeric characters, characterized in that the co-ordinate matrix for each descender letter has the character elements for the descender letter so arranged that those elements forming the "tail" of the descender letter are stored in character element rows which in a given character element row addressing sequence for the store in respect of characters other than descender letters, precede the character element rows in which the remaining elements for the descender letter are stored.

According to another aspect of the invention, a character generator arrangement of the kind referred to, including detector means for detecting when received character input data pertains to a descender letter, together with enabling means responsive to the detector means for enabling said data output means to produce character generating data for a particular n successive row addresses as produced by the row selection means and pertaining to a normal character or to a descender letter, as the case may be, n being the number of character element rows of the character format; is characterized in that the character store of the arrangement is as set forth in the preceding paragraph, and the row selection means is controlled by the logic control means so as in a read-out operation to repeat at least part of its addressing sequence such that at least these row addresses pertaining to character element rows which contain the elements forming the "tails" of descender letters occur twice.

With such a character generator arrangement the correct alignment of descender letters in a row of displayed characters is achieved in the read-out operation without the use of an adder circuit as is required in the known arrangement mentioned above.

DESCRIPTION OF THE DRAWINGS

In order that the invention may be more fully understood reference will now be made by way of example to the accompanying drawings, of which.

DESCRIPTION OF THE PREFERRED EMBODIMENT

Figure 1:
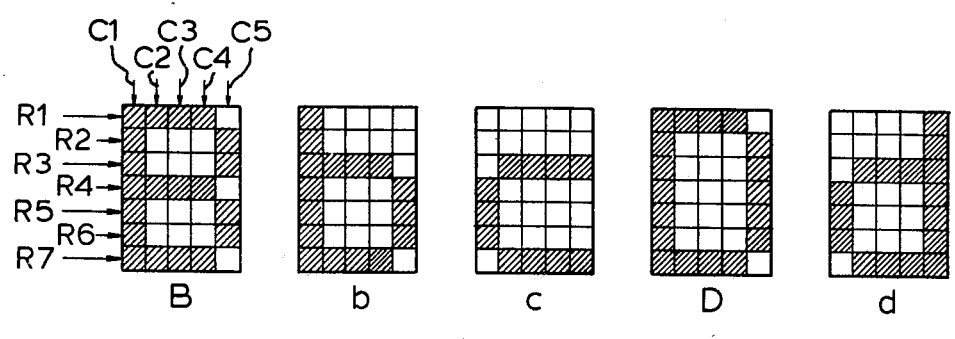
FIG. 1 illustrates the known format for storage of the characters B, b, c, D, d using a 7×5 character element format.
Figure 2:
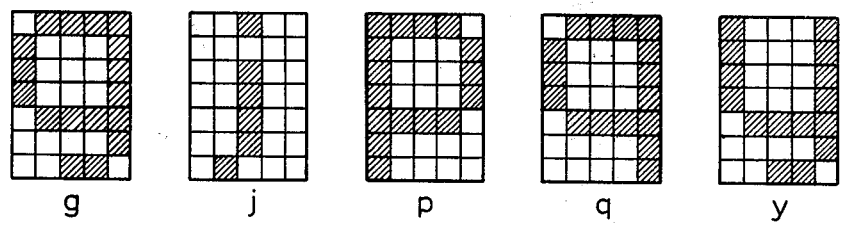
FIG. 2 illustrates as in FIG. 1 the decender characters g, j, p, q, y.
Figure 3:
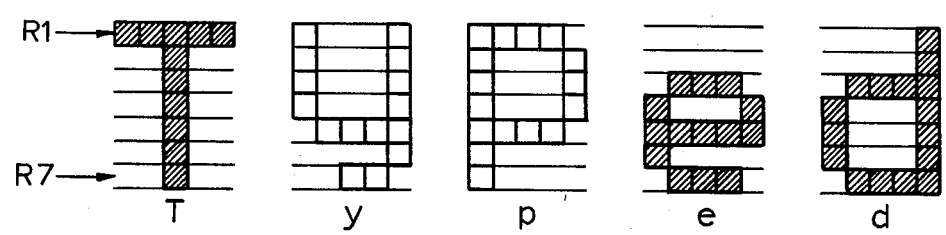
FIG. 3 illustrates the relative positioning of the storage of the character elements for decender characters with respect to other characters when stored in the known format.
Figure 4:
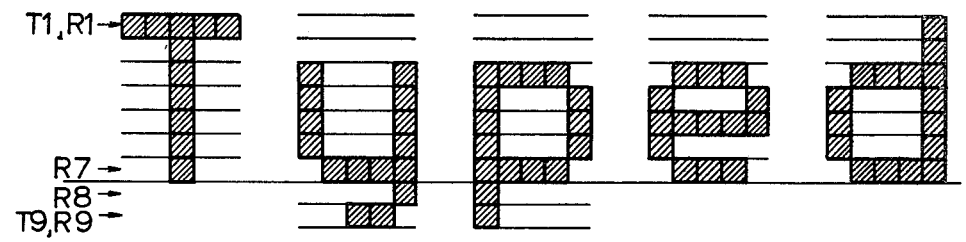
FIG. 4 illustrates how the characters of FIG. 3 are to be displayed.

Referring to the drawings, FIG. 1 shows by way of illustration the character shapes for the five letters B, b, c, D and d, using a 7×5 character element format comprised by a character matrix of 7 rows R1 to R7 and 5 columns C1 to C5 of discrete character elements. FIG. 2 shows the character shapes for the five lower case descender letters g, j, p, q and y, using the same character format. As can be seen from FIG. 3, as exemplified by the two descender letters y and p in the word "typed", the descender letters are, in effect, in a "raised" position in their respective character matrix as compared with the position of non-descender letters. However, in displaying the word "typed", the descender letters y and p would have to be "lowered" relative to the other letters in the word so that their "tails" lie below the line of the word; that is, when the word "typed" is displayed, the "tails" of the descender letters y and p lie in additional character element rows R8 and R9, as shown in FIG. 4.

Figure 7:
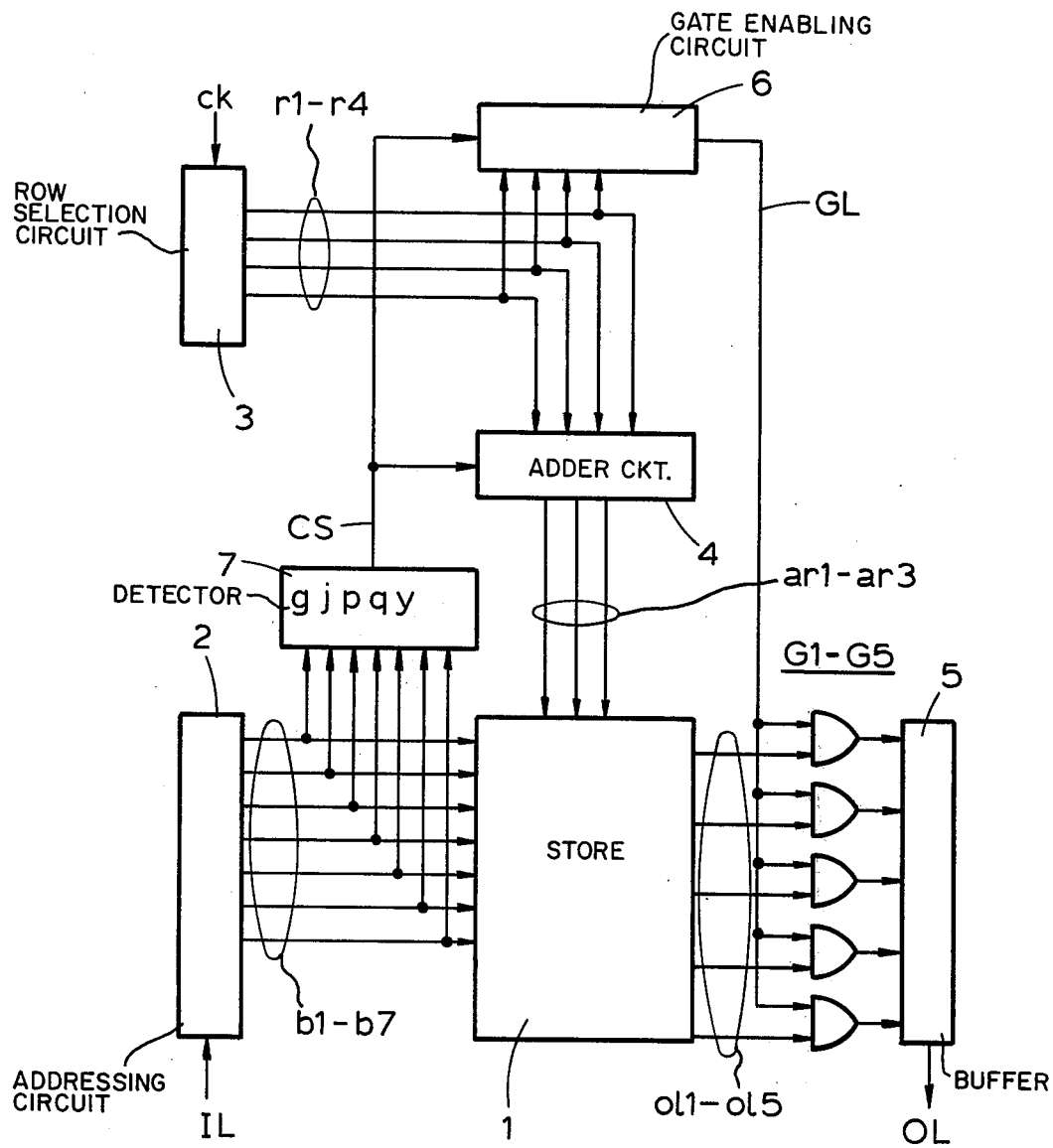
FIG. 7 shows, diagrammatically, a known character generator arrangement.

A known character generator arrangement for reading out such characters for display and including means for determining the correct alignment of descender letters relative to non-descender letters in a row of displayed characters, is shown in FIG. 7. This known character generator arrangement comprises a character store 1 in the form of a "read-only" memory device in which the characters for display are stored. The character store 1 is arranged to be addressed with character input data for a character selected for display from an input addressing circuit 2. This addressing is effected in parallel over 7 addressing leads b1 to b7 using binary coding. The input addressing circuit 2 serves as a serial-to-parallel converter for producing in parallel as character input data, 7-bit groups of input signals applied to it over an input lead IL. Thus, 128 different characters can be stored in the character store 1 and identified by a unique 7-bit binary code on the addressing leads b1 to b7. Conveniently, as aforesaid, ASCII coding can be used. The arrangement also comprises a row selection circuit 3 for producing row addresses for selecting, in turn, the character element rows of the character matrix. In order to cater for the display of descender letters, in a manner to be described, the row addresses are applied to the character store 1 over row addressing leads ar1 to ar3, via an adder circuit 4. Binary coding is also used for the row addresses.

In response to the application thereto of a particular character code and a particular row address code, the character store 1 produces on a group of 5 output leads o11 to o15 a combination of output signals (e.g. a combination of '1's and '0's) corresponding to the combination of character elements in the selected character element row of the selected character. Thus, if row R3 of the lower case letter e (see FIG. 3) is selected, the output signal combination would be, say, 01110. The output signals on the leads o11 to o15 are applied through a group of AND-gates G1 to G5 to an output buffer stage 5. This output buffer stage 5 serves as a parallel-to-serial converter for producing, in series as character generating data on an output lead OL, the groups of 5 parallel output signals from the character store 1.

The row selection circuit 3 is suitably a counter which is driven by clock pulses ck. In a practical embodiment of the arrangement, the clock pulse period may be 64 µS, with a new character code being applied to the character store 1 every 1 µS. In order to cater for descender letters, the row selection circuit 3 provides a number of row addresses additional to the number (7) of character element rows of the character matrix. In the present instance, it is assumed that the row selection circuit 3 provides a recurrent cycle of 9 row addresses which are produced as respective binary codes on four leads r1 to r4. These row address codes are applied to the adder circuit 4 and also to a gate enabling circuit 6 which has a "gate enable" output lead GL connected in common to one input of each of the AND-gates G1 to G5. The arrangement further comprises a detector circuit 7 which detects when a character code on the leads b1 to b7 pertains to a descender letter and, accordingly, produces a control signal on an output lead CS. This control signal is applied to both the adder circuit 4 and the gate enabling circuit 6.

When a character code pertaining to a non-descender letter is applied from the input addressing circuit 2 to the character store 1, there is no control signal on the output lead CS, so that the adder circuit 4 remains unresponsive in that it adds a naught to each row address code applied to it. Thus, the first 7 row address codes of a cycle on the leads r1 to r3 (r4 is not needed) are passed unmodified onto the leads ar1 to ar3 to select in turn the 7 character element rows of the character matrix. Because of the absence of the control signal on the output lead CS, the gate enabling circuit 6 (which itself is suitably composed of gate logic) produces the "gate enable" signal on the output lead GL for the occurrence of each of the first 7 row address codes. As a result, the gates G1 to G5 pass to the output buffer stage 5 the output signal combinations from the character store 1 for the first 7 row address codes of a cycle from the row selection circuit 3.

When a character code pertaining to a descender letter is applied from the input addressing circuit 2 to the character store 1, this character code is detected by the detector circuit 7 which thus produces the control signal on the output lead CS. The effect of this control signal as applied to the gate enabling circuit 6 is to cause the latter to produce the "gate enable" signal on the output lead GL for the occurrence of each of the last 7 row address codes in the cycle produced by the row selection circuit 3. The effect of the control signal as applied to the adder circuit 4 is to cause the latter to add minus two ($-2$) to each row address code applied to it. Thus, the last 7 row address codes of a cycle on the leads r1 to r4 are changed by the adder circuit 4 to become the first 7 row address codes on the leads ar1 to ar3. The effect of this can be seen from FIG. 4. If the character element rows R1 to R9 correspond to display lines T1 to T9 for a row of displayed characters, then for a non-descender letter such as T, the character element rows R1 to R7 are addressed during the occurrence of their own row address codes to display the letter T in the display lines T1 to T7. However, for a descender letter such as y, the character element rows R1 to R7 are addressed during the occurrence of the address codes R3 to R9, respectively, to display the letter y in the display lines T3 to T9; that is, the display of the descender letter is delayed by two row address periods to bring it into correct alignment in the character row.

The known arrangement just described has the disadvantage, mentioned previously, that the adder circuit 4 has to operate at the character input data rate (e.g. at 1 MHz as aforesaid), which requires the adder circuit to be complex in implementation. The character generator arrangement according to the invention shown in FIG. 8 avoids this disadvantage by dispensing with the adder circuit.

Figure 5:
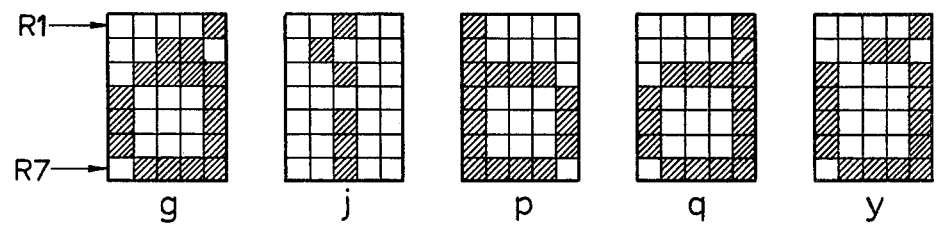
FIG. 5 illustrates the storages of the decender characters g, j, p, q, y in accordance with the present invention.
Figure 6:
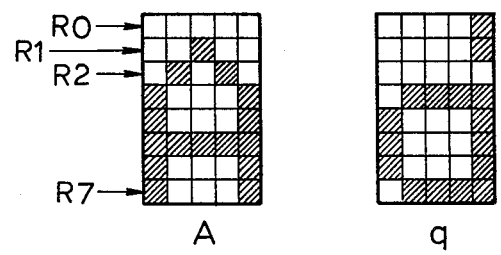
FIG. 6 illustrates the relative positioning of the storage of the character elements for the decender character q with respect to the character A in accordance with the present invention.
Figure 8:
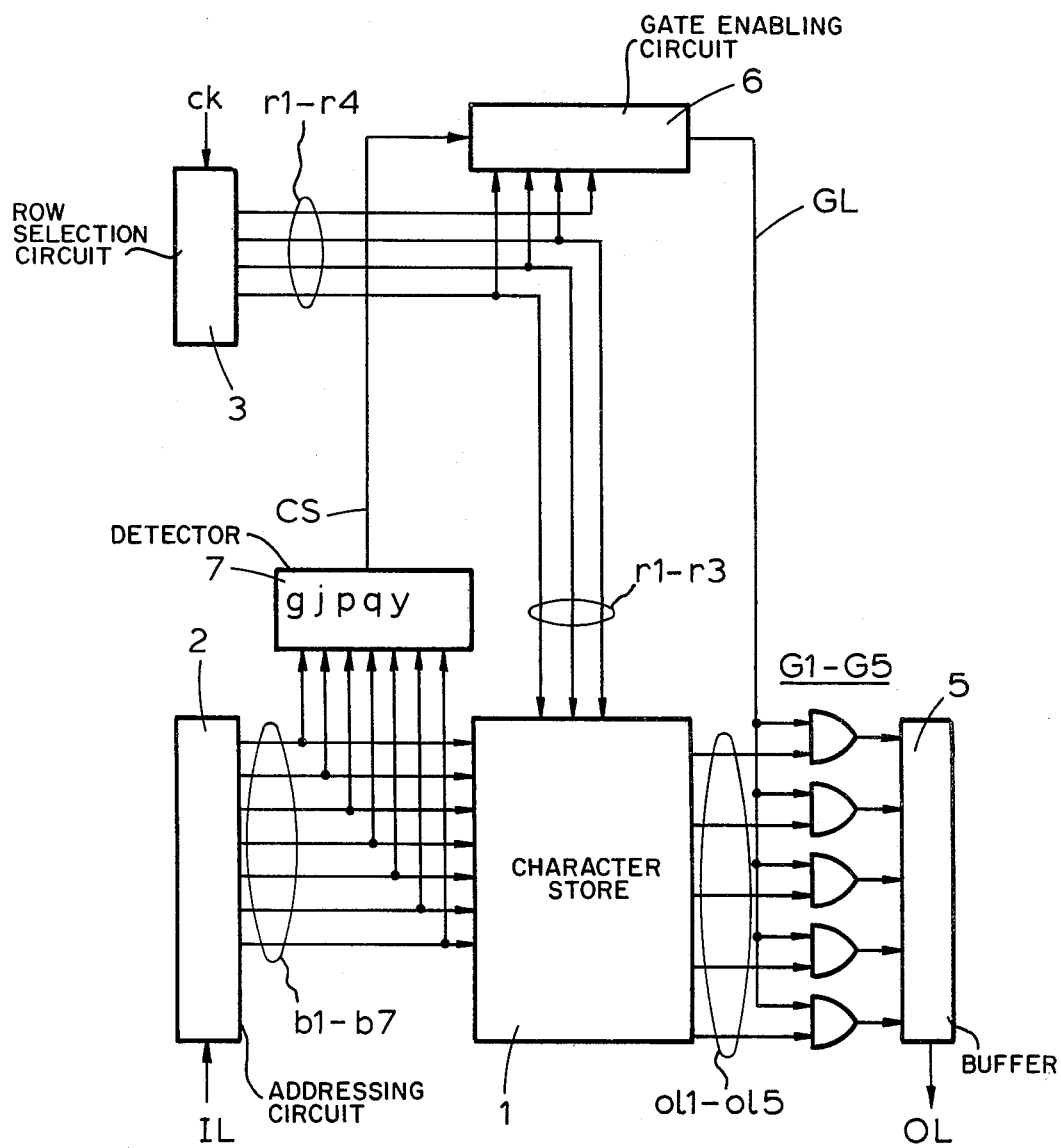
FIG. 8 shows, diagrammatically, a character generator arrangement according to the invention.

Referring to FIG. 8, in the arrangement there shown, elements which correspond to elements in the arrangement of FIG. 7 have been given the same reference letters and numerals. Since in FIG. 8 the adder circuit has been dispensed with, the output leads r1 to r3 from the row selection circuit 3 are connected directly to the character store 1. In accordance with one aspect of the invention, in the character store 1 the character matrix for each descender letter has the character elements for the descender letter so arranged, as shown in FIG. 5, that those elements forming the "tail" of the descender letter are stored in character element rows R1 and R2 above (or before in the addressing sequence) the character element rows R3 to R7 in which the remaining elements for the descender letter are stored. In accordance with the second aspect of the invention, in the arrangement of FIG. 8 the row selection circuit 3 provides on the leads r1 to r3 at least some of the 7 row address codes twice in a read-out operation, and it also provides on the lead r4 an indication to the gate enabling circuit 6 as to whether in a read-out operation it is the first or the second occurrence of a row address code. Conveniently, this can be achieved using a conventional 4-bit binary code for the row address codes. A '0' or '1' bit on the lead r4 signifies to the gate enabling circuit 6 whether the remaining eight 3-bit codes on the leads r1 to r3 are occurring for the first or for the second time. Since there are only seven character element rows in the character format, one of the eight 3-bit codes on the leads r1 to r3 needs to be "slipped" (e.g. by switchable gating in the row selection circuit 3 in order to provide a recurrent cycle of only 7 row address codes. Alternatively, the character format in the character store 1 can include a spare row as illustrated in FIG. 6 for the letters A and q in order to achieve a natural 3-bit binary count of eight. The position of the spare row in the character format depends on the character, being at the top or bottom for a non-descender letter and at an intermediate position for descender letters. More than one spare row may be provided, the only requirement being that for both descender letters and non-descender letters there is a continuous sequence of 7 character element rows which can be addressed by seven successive row address codes of a cyclic count in which at least some of the row address codes occur twice.

Consider now the operation of the arrangement of FIG. 8, for a non-descender letter, the gate enabling circuit 6 responds to the '0' on lead r4 to enable the gates G1 to G5 for the first 7 row address codes produced on the leads r1 to r3 in a first cycle. For a descender letter, the circuit 6 responds to the '1' on lead r4, due to the presence of the control signal on the lead CS, to enable the gates G1 to G5 for the last 5 row address codes produced on the leads r1 to r3 in the first cycle and the first 2 row address codes produced in the second cycle. This provides for the "lowering" of the descender letters into their correct alignment in a row of characters, without the need of an adder circuit.

Where the row selction circuit provides a natural binary count of eight 3-bit row address codes, the character element rows, including the space row, of the character format as shown in FIG. 6 may be identified with row address codes in accordance with the following Table.

TABLE

| Row | Address Code | | | | | | | |
|---|---|---|---|---|---|---|---|---|
| | 1st cycle | | | | 2nd cycle | | | |
| | r4 | r3 | r2 | r1 | r4 | r3 | r2 | r1 |
| R0 | 0 | 0 | 0 | 0 | 1 | 0 | 0 | 0 |
| R1 | 0 | 0 | 0 | 1 | 1 | 0 | 0 | 1 |
| R2 | 0 | 0 | 1 | 0 | 1 | 0 | 1 | 0 |
| R3 | 0 | 0 | 1 | 1 | | | | |
| R4 | 0 | 1 | 0 | 0 | | | | |
| R5 | 0 | 1 | 0 | 1 | | | | |
| R6 | 0 | 1 | 1 | 0 | | | | |
| R7 | 0 | 1 | 1 | 1 | | | | |

Thus, for a non-descender letter the spare row is R0 and has the unused code 0 000, whereas for a descender letter the spare row is R2 and has the unused code 0 010.

Figure 9:
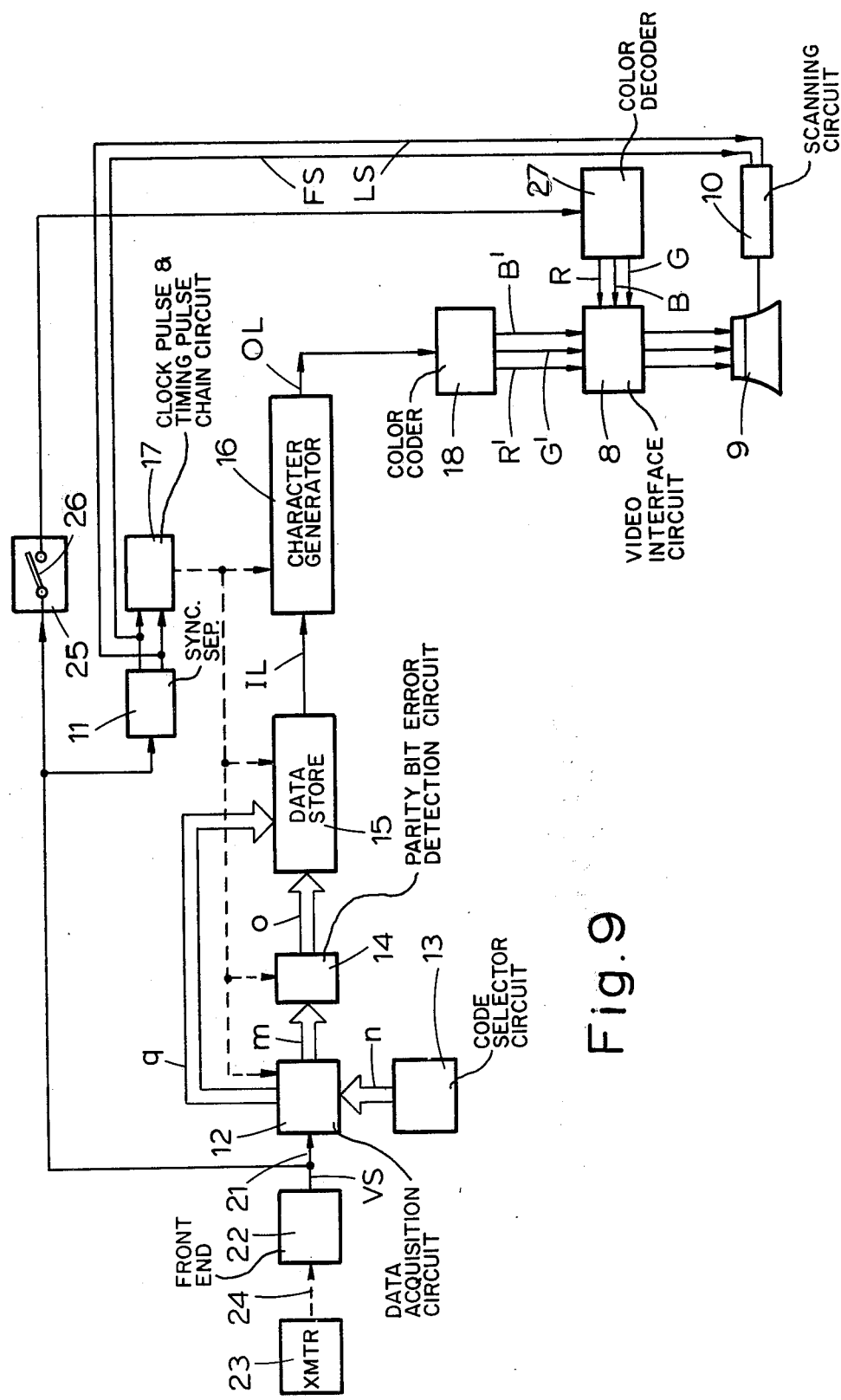
FIG. 9 shows, diagrammatically, a display system embodying the character generator arrangement of FIG. 8.

Referring now to FIG. 9 of the drawings, which shows diagrammatically a display system in the form of a television receiver arrangement which embodies the invention and which is for displaying selectively either a television picture, which is produced from picture information in a normal broadcast or cable television video signal, or alpha-numeric text or other message information which is produced from coded data pulses which are transmitted in the video signal in vertical or field-blanking intervals thereof.

An incoming television video signal VS appears at an input lead 21 of the television receiver arrangement via its front end 22 which comprises the usual amplifying, tuning, i.f. and detector circuits. The front end 22 is assumed to be adapted to receive the video signal VS from a television transmitter 23 via a conventional over-air broadcast or cable transmission link 24.

For normal picture display in the television receiver arrangement, the received video signal is applied to a selector circuit 25 which included a selector switch 26. When the switch 26 is closed, the video signal VS is applied to a color decoder 27 which produces the R, G and B component signals for the picture display, these component signals being applied via a video interface circuit 8 to the red, green and blue guns of a color television picture tube 9. Scanning circuits 10 for the tube 9 receive the usual line and field synchronising pulses LS and FS from a synch. separator circuit 11 which extracts these synchronising pulses from the incoming video signal VS.

Coded data pulses representing message information in the video signal VS do not affect the picture display because they occur in one or more lines in the field-blanking interval when there is no picture display. Of the lines occurring in the field-blanking interval, most could be used to transmit coded data pulses representing message information. However, in the BBC/IBA Teletext System at present, only lines 17/18 of even fields and lines 330/331 of odd fields of the 625 line broadcast television system are used in the United Kingdom. (See "Broadcast Teletext Specification", September 1976, published jointly by the British Broadcasting Corporation, Independent Broadcasting Authority and British Radio Equipment Manufacturers' Association).

The video signal VS on the input lead 21 is also applied to a data acquisition circuit 12 which includes a data clock pulse generator (not shown) for deriving a data clock pulse train from the coded data pulses representing the message information.

It is assumed that the message information represented by the coded data pulses contained in the video signal VS is divided into different pages of information, and that each page is for display as a whole on the screen of the picture tube 9, with the coded data pulses representing each page of information being repeated periodically in a recurrent cycle with or without updating of the information. It is further assumed that each page of message information is identified by means of a unique page address code which is included in the coded data pulses and defines the page number. The television receiver arrangement includes a code selector circuit 13 which controls the particular coded data pulses that are acquired by the data acquisition circuit 12 at any time. (This control is indicated by broad-arrow connection n representing the presence of a group of n parallel channels which form an n-bit channel link for carrying n bits of information required for data selection—other groups of parallel channels forming multi-bit channel links in the television receiver arrangement are represented similarly as m, o, and q numbers of channels and bits).

The acquired coded data pulses are clocked serially into the data acquisition circuit 12 by the data clock pulse train produced in the latter. From the data acquisition circuit 12, the acquired coded data pulses are fed in parallel groups of m bits to a parity bit error detector circuit 14 over an m-bit channel link, an m bit byte being required for each character (or other item of information) contained in the message information. It is assumed that $m=8$, so that a character byte comprises a character code consisting of 7 bits plus a single parity bit, and that the circuit 14 functions to check for odd parity in each character byte and to pass the character code for storage only if the odd parity is detected.

The 7-bit character codes which satisfy the odd parity check are fed from the detector circuit 14 in parallel over an o-bit channel link ($o=7$) to a data store 15. The data store 15 can store a complete page of message information. In a typical Teletext transmission, each page of message information would contain up to 24 rows of characters, with each row containing up to 40 characters. Thus, in order to identify the different characters of a page, it is furthermore assumed that the coded data pulses also include an address code for each character, this address code employing q bits and being fed to the data store 15 over a q-bit channel link to control the storage therein of the character codes.

In view of the restricted transmission time which is available for transmitting the coded data pulses representing message information, for instance, sufficient time to transmit the coded data pulses for only one character row during a television line in the field-blanking interval, character data for a page of message information has to be stored row-by-row in the data store 15 over a relatively large number of television fields. This storing of character data row-by-row in the data store 15 is under the control of the address codes received from the data acquisition circuit 12 over the q-bit channel link.

The television receiver arrangement includes a character generator arrangement 16 embodying the present invention. This arrangement 16 is responsive to the character data stored in the data store 15 to produce character generating data which can be used to derive what is effectively a new picture signal for displaying the characters represented by the stored character data.

In order to effect character display on the screen of the picture tube 9 using standard line and frame scans, the logic of the television receiver arrangement in respect of character display is so organised that for each row of characters to be displayed, all the characters of the row are built up television line-by-televison line as a whole, and the rows of characters are built up in succession. It takes a number of television lines to build up one row of characters. In the first television line of each field, character data from the data store 15 to the character generator arrangement 16 would cause the latter to produce character generating data in respect of the first row of discrete elements for the first character of the row, then in respect of the first row of discrete elements for the second character, and so on for the successive characters of the row. In the second television line, character generating data in respect of the second row of discrete elements for each character of the row would be produced in turn, and so on for the remaining television lines concerned.

The logic of the television receiver arrangement is organised by means of a clock pulse and timing pulse chain circuit 17 which provides appropriate clock and timing pulses to the data store 15, to the character generator arrangement 16, to the data acquisition circuit 12 and to the parity bit error detector circuit 14. The circuit 17 is synchronised in operation with the scanning circuits 10 of the picture tube 9 by the line and field synchronising pulses LS and FS extracted from the incoming video signal VS by the sync. separator circuit 11.

The output from the character generator arrangement 16 is applied to a color coder 18 which produces $R^1$, $G^1$ and $B^1$ component signals for character display, these component signals being also applied to the video interface circuits 8. The color coder 18 can be controlled (in a manner not shown) by selected items of the character data in the data store 15 to provide a controlled color character display. Of course, black-and-white picture and character display is also possible, in which event the color decoder 27 and color coder 18 would be omitted.

The invention is, of course, also applicable to other display systems, such as television monitors for computer read-out terminals.

Also, the character generator arrangement 16 can be arranged to receive the bits of a character code directly in parallel from the data store 15, in which case the input addressing circuit (2) of the arrangement would not need to perform any serial-to-parallel conversion and could be implemented by a simple buffer stage.

What is claimed is:

1. A character generator arrangement for generating alpha-numeric characters for display by electrical means, said arrangement comprising:

a character store in which each of the different characters are stored in a co-ordinate matrix of discrete character elements, each of said matrix being addressable by row and column, said character elements for each character representing a decender letter—lower case letters g, j, p, q and y—being arranged in said matrix such that character elements forming the tail of each of said decender letters are stored in rows of said matrix which precede the rows in which the remaining character elements for the particular decender letter are stored;

addressing means having an input for receiving input signals corresponding to the address of a particular character, and a plurality of outputs, coupled to said character store for providing, in parallel, the address of said particular character;

row selection means coupled to said store for selecting, in sequence, the row addresses for any of said characters, said row selection means further including means for repeating the selection of said addresses, in sequence, whereby, in the case of said decender letters, at least the addresses of the character rows containing the character elements pertaining to the tails of the decender letters are repeated;

data output means coupled to said character store for providing character element data in the selected character element row of the selected character;

enabling means coupled to said row selection means for causing said data output means to generate said character element data by row in sequence for said selected character;

and detector means coupled to said addressing means and said enabling means for indicating to said enabling means the selction of the address of any of said decender letters, whereby, when said detector means indicates the presence of a decender letter address, said enabling means suspends the operation of said data output means for the initial rows comprising the tail of the decender letter, thereafter allowing the data output means to supply the character element data for the remaining portion of said selected character address which would include the repeat of the first rows containing the character elements representing the tail of the decender letter.

2. A character generator arrangement as claimed in claim 1, characterized in that said character store is a "read-only" memory device.

* * * * *